Nov. 7, 1933.  O. FÖPPL  1,934,597

OSCILLATION DAMPER FOR SHAFTS

Filed Oct. 3, 1930

INVENTOR:
Otto Föppl,
BY Paul E. Schilling,
ATTORNEY.

Patented Nov. 7, 1933

1,934,597

UNITED STATES PATENT OFFICE 1,934,597

OSCILLATION DAMPER FOR SHAFTS

Otto Föppl, Brunswick, Germany

Application October 3, 1930, Serial No. 486,271, and in Germany October 12, 1929

4 Claims. (Cl. 74—6)

Devices are already known by means of which the oscillations which arise in crank shafts, transmission shafting and so forth are damped out. In these devices, as a rule, two parts move relatively to each other and, by frictional means, or in some similar fashion, dissipate the energy of oscillation which is so detrimental to the durability of the shafts.

In the new device the energy of oscillation accumulated in the shaft is dissipated, as damping in the structural material, by the natural oscillations of an arrangement mounted on the said shaft. Thus the damping device is an arrangement with a pronounced natural oscillation period $n_2$ and is so dimensioned that the value $n_2$ coincides with the natural oscillation period $n_1$ of the shaft together with the centrifugal masses mounted thereon ($n_2=n_1$). As soon as the natural oscillations ($n_1$) appear in the shaft the damping device is likewise excited into oscillation at its natural periodicity ($n_2$). The damping device is made of a material having a relatively low modulus of elasticity and great damping properties (for instance, rubber or, in many cases, fibrous material, cork, copper, and so forth). Owing to resonance effects the damping device attains relatively large amplitudes and, at the same time, by damping action within the structural material, dissipates a considerable part of the energy imparted to it.

It is, of course possible to investigate theoretically the question as to just why the elastic damper should have approximately the same periodic time of oscillation as the crankshaft or the like. The conclusion then arrived at is that after mounting the damper the primary oscillations which originally were present in the shaft become split up in the composite system into two oscillations one of which has the periodicity $n$, which is slightly below the periodicity $n_1$ of the shaft alone, while the other has a periodicity $n^+$ which is slightly above the periodicity $n_1$. When the natural periodicities $n_1$ and $n_2$ are approximately equal the conditions are such that both $n$ and $n^+$ can build up rapidly and hence the action of the damper is particularly powerful.

The damper itself may consist of a part of the shaft made of material with a low modulus of elasticity and high damping properties (rubber, for example). The length of this piece of shafting must be so determined in accordance with the known equations of the theory of oscillations that the damper and the shaft to be damped are brought into resonance. When the fulfilment of this condition would result in the length of the damper being too great the free end of said damper may be constructed as a centrifugal mass made of heavy material (such as steel) and not taking part in the damping action.

When the shaft rotated those parts of the material lying nearer to the centre will not be stressed at all, or only stressed to a minor degree. Thus, for the case under consideration they are unimportant and may be omitted. The damper will then consist of a hollow tubular body.

If, for constructional reasons, the fitting of a shaft-like damper is impossible, owing to the consequent increase in the length of the shaft, the damper may be formed as a solid flywheel, fixed to the shaft as rigidly as possible and made of yielding material with high damping properties, such as rubber, for example. Since, with this arrangement, those parts of the material of the flywheel which lie next to the shaft are subject to the greatest distortion, it is these parts which make the greatest contributions to the damping out of the rotary oscillations of said shaft. In order that this fact may be turned to account it is advantageous that a damper, which extends outward in radial direction be so proportioned that the relationship of the thickness $c$ to the radius $r$ at every point of the flywheel approximately satisfies the equation $c \cdot r = a$ constant. This results in the disc-like damper being so thickened towards the centre that cylindrical cross sections at all points of the disc present equal surfaces.

Among the materials of which the damper may be made the most obviously suitable is rubber, of which there are very many kinds. All kinds of rubber have strong damping properties, in that, before reacting the limit of resistance to oscillation they convert into heat large amounts of energy imparted to them under conditions of alternating stress. The various kinds of rubber differ one from another in that the highly elastic ones have to be greatly distorted before they contribute any substantial damping effect, while the less elastic ones, even when but slightly distorted, exhibit considerable plastic deformation. It is important for the construction of the damper to use a rubber which is as highly elastic as possible, so that the mass of rubber, on attaining the number of revolutions corresponding to resonance, is shaken up as much as possible, so that large forces may be set up.

Several constructional embodiments are illustrated by way of example in the accompanying drawing, in which.

$a$ is for instance, the end of the crank-shaft of an air-craft motor, the oscillatory impulses of which are to be damped. The damping device is preferably located at a position where the angular deviations of the shaft are especially great (for instance, at the end of the shaft). On the shaft is mounted a solid fly-wheel $b$ of yielding material with high damping properties, such, for instance, as rubber. The centre of the fly-wheel is secured to the shaft as rigidly as possible. The centrifugal mass $b$ can execute rotary oscillations about the centre line of the shaft in such a way that, for instance, one element, at a distance $r$ from the centre oscillates with an amplitude $s$. The amplitudes attained are particularly large when the oscillations are excited by rotary impulses from the shaft in time with the natural period of oscillation. A material with strong damping properties, such as rubber converts a considerable part of the energy of the impulses it receives into heat and, in this way, reduces the oscillatory movements of the shaft $a$ at particular periodicity in question. The natural periodicity of the centrifugal mass $b$ depends, inter alia upon the weight, the modulus of elasticity and the external diameter of the fly-wheel. These values may be so determined that the natural periodicity $n_2$ coincides with the natural periodicity $n_1$ of the shaft, as ascertained by calculation or by experiment, the best effect being then obtained.

Figure 1:
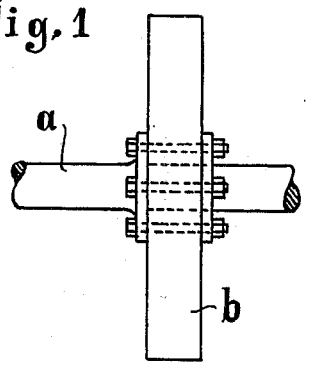
Figs. 1 and 2 show in side elevation and in end view, respectively, a disc-shaped damper, mounted on a shaft.
Figure 2:
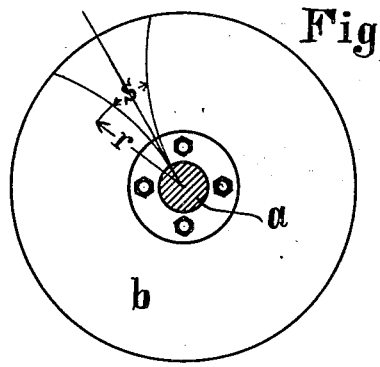
Figure 3:
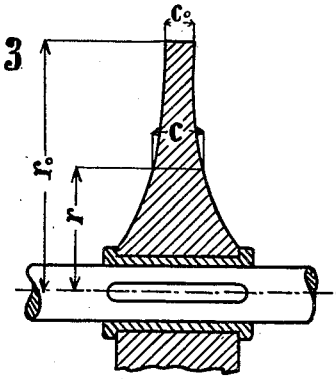
Figs. 3 and 4 show another disc-shaped damper, in cross-section and in side view.
Figure 4:
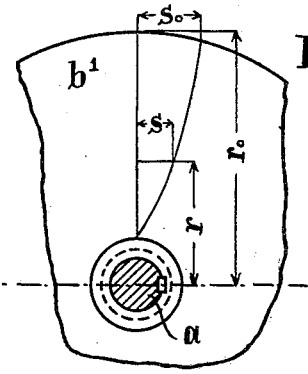

In Figs. 3 and 4 the disc-like damper $b_1$ is thickened towards the hub in such a fashion that the thickness $c$ of the disc $b_1$ varies with the radius $r$ approximately in conformity with the equation $c \cdot r = a$ constant.

Figure 6:
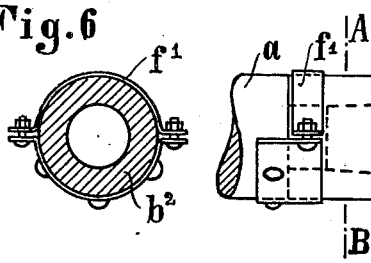
Fig. 6 is a cross-section on line A—B of Fig. 5.
Figure 5:
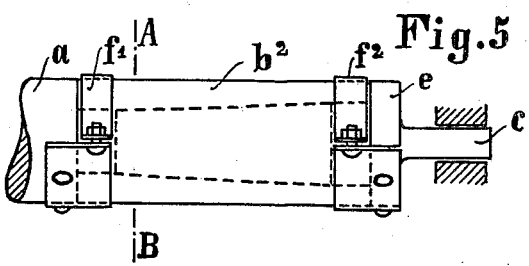
Fig. 5 shows a shaft-like damper in elevation.

In the constructional examples according to Figs. 5 and 6 the damper is formed as a hollow-cylinder $b_2$ which, at one end, is fixed rigidly to the shaft $a$ to be damped and which has the same external diameter as said shaft $a$. At the same time the bore of the hollow cylinder $b_2$ is made conical, so that the wall thickness of said cylinder gradually increases towards the end of the shaft $a$. The damper is clamped to the shaft $a$ by a clip $f_1$. The natural periodicity of the cylindrical damper is, as in the case of the disc-like dampers of Figs. 1 to 4, is attuned, according to the known equations of the theory of oscillation, to the natural periodicity of the shaft $a$ together with such centrifugal masses as may be mounted thereupon. This, in the case of the cylindrical damper $b_2$ is effected by suitable choice of the length $l$. If the fulfillment of this condition would result in the length $l$ of the damper $b_2$ being too great another centrifugal mass $e$ may be fixed to the free end of the damper, this mass being made of a heavy material which does not take part in the damping action (for instance, of steel). The presence of this mass lowers the natural periodicity of the damper material. When the damper $b_2$ carries an auxiliary centrifugal mass such as $e$ an additional bearing may also be provided at the point $c$.

Figure 8:
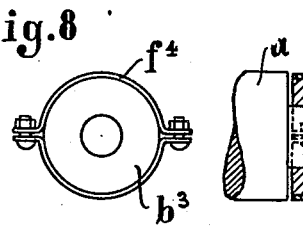
Fig. 8 is an end view of the same.
Figure 7:
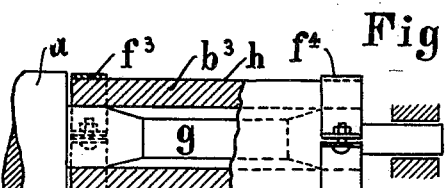
Fig. 7 shows another shaft-like damper in elevation.

If the periodicity of the crank-shaft is very high the shaft-like damper of Figs. 5 and 6 must be made correspondingly short. It is then advantageous to make the damper of a cylindrical rubber tube $b_3$ which, as shown in Figs. 7 and 8 is fastened to both ends $f_3$ and $f_4$ of a member $g$, rigidly mounted on the crank-shaft. The clamped ends $f_3$ and $f_4$ execute the same oscillatory movements as the crank-shaft. The rubber tube, at its middle portion $h$, executes rotary oscillations of very large amplitude if the natural periodicity of said rubber tube, fixed at both ends is, again, about equal to the natural periodicity $n_1$ of the crank-shaft $a$.

I claim:—

1. The combination with a rotary shaft having a natural frequency of oscillation; of a rubber sleeve mounted concentrically on the shaft to rotate therewith, said sleeve being tuned to resonance with the natural frequency of oscillation of the shaft, said sleeve having both ends fixed to the shaft and its central portion free from said shaft.

2. A vibration damper adapted to be mounted on a rotary shaft for damping the torsional vibrations of said shaft consisting of a homogeneous inertia mass of elastic material constituting the sole damping means and having a low modulus of elasticity and a natural frequency of oscillation substantially equal to that of the rotary shaft, and means for connecting said mass on said shaft.

3. A vibration damper adapted to be mounted on a rotary shaft for damping the torsional vibrations of said shaft consisting of a homogeneous inertia mass of elastic material constituting the sole damping means and having a low modulus of elasticity and a natural frequency of oscillation substantially equal to that of the rotary shaft, said mass being in the form of a disk having a relatively thick central portion and a relatively thin peripheral portion and decreasing gradually and regularly from the central to the peripheral portion, and means for connecting said mass on said shaft.

4. A vibration damper adapted to be mounted on a rotary shaft for damping the torsional vibrations of said shaft consisting of a homogeneous inertia mass of elastic material constituting the sole damping means and having a low modulus of elasticity and a natural frequency of oscillation substantially equal to that of the rotary shaft, said mass being in the form of a sleeve having one end surrounding the shaft and in contact therewith and being free from the shaft adjacent said end, and means for connecting said mass on said shaft.

OTTO FÖPPL.